United States Patent [19]

Barcella et al.

[11] Patent Number: 4,812,107
[45] Date of Patent: Mar. 14, 1989

[54] METHOD OF MANUFACTURING A CONTROL WHEEL FOR THE HIGH-PRESSURE ROTOR OF A STEAM TURBINE

[75] Inventors: Santino Barcella, Neuenhof, Switzerland; Manfred Befeld, Ludwigshafen, Fed. Rep. of Germany; Guy Faber, Oberrohrdorf; Paul Slepcevic, Nussbaumen, both of Switzerland

[73] Assignee: BBC Brown, Boveri & Company, Ltd., Baden, Switzerland

[21] Appl. No.: 832,334

[22] Filed: Feb. 24, 1986

[30] Foreign Application Priority Data

Feb. 28, 1985 [CH] Switzerland .................. 910/85

[51] Int. Cl.⁴ ............................................. F01D 5/30
[52] U.S. Cl. ................................... 416/191; 228/165; 228/182; 228/160; 228/231; 29/156.8 R; 416/213 R
[58] Field of Search ............ 29/156.8 R, 156.8 B; 228/165, 219, 182, 225, 160; 416/213 R, 191, 193 A; 415/185

[56] References Cited

U.S. PATENT DOCUMENTS

| 1,247,400 | 11/1917 | Herr | 416/191 |
| 2,242,308 | 5/1941 | Kroon | 416/191 |
| 2,392,281 | 1/1946 | Allen | 228/165 X |
| 3,182,955 | 5/1965 | Hyde | 416/191 X |

FOREIGN PATENT DOCUMENTS

| 995813 | 12/1951 | France | 29/156.8 R |
| 64042 | 9/1949 | Netherlands | 29/156.8 R |

Primary Examiner—Kenneth J. Ramsey
Attorney, Agent, or Firm—Burns, Doane, Swecker & Mathis

[57] ABSTRACT

A control wheel intended for welding onto the high-pressure rotor of a steam turbine is manufactured from a ring of individual blades welded together. For this purpose, all of the individual blades are provided with shrouds and root platforms having welding grooves formed therein. After being welded together into a ring, closed on all sides, the control wheel is annealed, machined and finally heat-treated.

6 Claims, 3 Drawing Sheets

METHOD OF MANUFACTURING A CONTROL WHEEL FOR THE HIGH-PRESSURE ROTOR OF A STEAM TURBINE

FIELD OF THE INVENTION

The invention concerns a method for manufacturing a control wheel for a high-pressure rotor of a steam turbine. It also relates to a control wheel manufactured by this method.

In order to achieve good part load behavior in a steam turbine, an impulse stage is often fitted as a control stage upstream of the reaction stages of the high-pressure section of the turbine. Because it is designed with a low degree of reaction, the impulse stage can be operated by a partial admission of steam. The steam flow through the turbine, and hence its power, is controlled by this partial admission at the control stage. However, the downstream reaction stages operate with full admission at all loads.

The control stage normally consists of two rows of elements; the first being a guide row comprising nozzle elements, and the second being a row which when combined with the associated part of the rotor, forms the rotor wheel.

The rotor wheel is produced by welding a prefabricated control wheel onto a corresponding part of the rotor. The control wheel itself is also a welded construction. Welding is the most intensive and homogeneous of all mechanical connections. It ensures that the blading-shaft connection can safely absorb the static forces due to centrifugal force and the dynamic forces caused by intermittent steam flows, even at very high temperatures.

BACKGROUND OF THE INVENTION

A manufacturing method and a control wheel of the type mentioned above are known. During the manufacture of the control wheel, the blades, together with their profile, root and shroud parts, are milled from bar material. The individual blades are welded together at the root and shroud providing a complete ring. This in turn, is welded onto the rotor with a large bell seam by using a submerged arc process. After stress-relief heat treatment, the entire wheel part is turned and the root of the bell seam, in which the initiation of cracks tends to occur, is removed.

The shrouds are welded by this method, into groups each made up of three or more individual blades. These groups are matched before being connected to avoid vibration excitation due to the steam flow emerging from the nozzles. The groups are not connected together at the shrouds.

In order to obtain a closed ring, the individual blades or the groups of blades must be connected together in their root zones. To this end, the radial extent of the root platforms is dimensioned substantially larger than the shrouds. The weld seams do not extend to the wall of the root platform forming the flow boundary. In consequence, the root zones of the weld seams at the blade roots are removed by drillings at the periphery of the disk, which gives the welded control wheel its characteristic appearance.

Currently the materials used are difficult to weld, an example being $X_{22}CrMoV_{121}$. Nevertheless, welded connections have to be produced having the same strength and ductility as the basic material. For this reason, the weld material must be subjected to heat treatment. However, the weld material used, which must have a high C content so that it does not become two-phase, has the property that it does not slowly transform at preheating temperatures of about 300° C., as low-alloy steels do; it remains austenitic and can only be transformed by cooling. For this reason, the control wheel is normally cooled after it has been welded together so that the desired transformation takes place. The brittle martensite which results is subsequently made tougher and more ductile by annealing.

A disadvantage in this solution is the fact that the welds are subject to the danger of cracking during the cooling phase mentioned. Although the transformation is improved with additional cooling to lower temperatures, and improved ductility is achieved during subsequent annealing, the danger of cracking increases quite substantially. For this reason, it has not, until now, been possible to weld the shrouds together to form a closed ring.

Another disadvantage of known control wheels is that the roots of the weld seam in the root platforms cannot be inspected, therefore, at least the root seam, which is subject to cracking, must be bored out for safety reasons.

OBJECT OF THE PRESENT INVENTION

The inventions defined in the present invention are, therefore, based on the objective of producing a manufacturing method, of the type mentioned herein above, in which the danger of cracking is minimized, even in the event of notches being present, and by which it is possible to manufacture a control wheel which can be optimized both with respect to extremely high loads due to both steam forces and centrifugal forces and with respect to blading geometry and the number of blades.

The fact that the weld seams of the blade roots are accessible for testing represents a particular advantage of the present invention.

BRIEF DESCRIPTION OF THE DRAWING

Three exemplary embodiments of the control wheel according to the invention are shown diagrammatically in the drawing in which.

DETAILED DESCRIPTION OF THE PREFERRED EMBODIMENT

Figure 1:
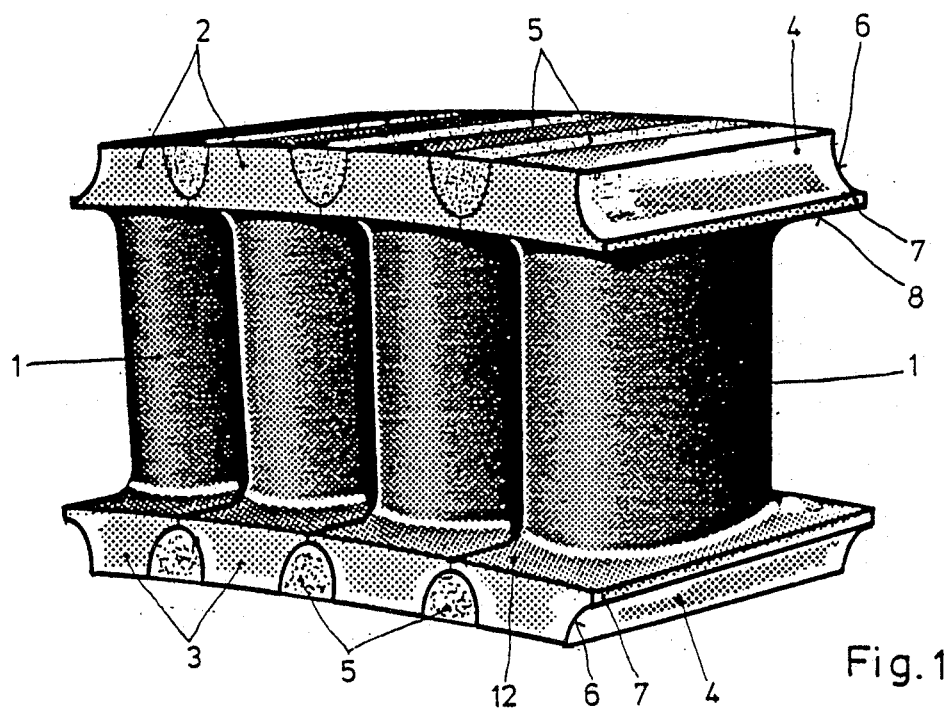
FIG. 1 shows a perspective view of a ring segment consisting of four blades.

In the figures, in which the same elements are provided with the same reference numerals, only the parts essential for understanding the invention are included. Thus, for example, the entire high-pressure rotor of the steam turbine is not shown.

The control wheel, which is only partially shown in FIG. 1, consists of a ring of individual blades each comprising a blade airfoil 1, a shroud 2 and a root platform 3, and being usually machined out of solid material. The blades are joined together at their respective root platforms and shrouds so that closed rings are formed by both the root platforms and the shrouds. In the preferred embodiment, the material used for the blades is a heat-treatable, heat-resistant, highly alloyed CrMoV steel, for example $X_{22}CrMoV_{121}$ to DIN 17240.

Each shroud 2 and root platform 3 is provided with two welding grooves 4, which are filled with transverse seams 5.

Figure 2:
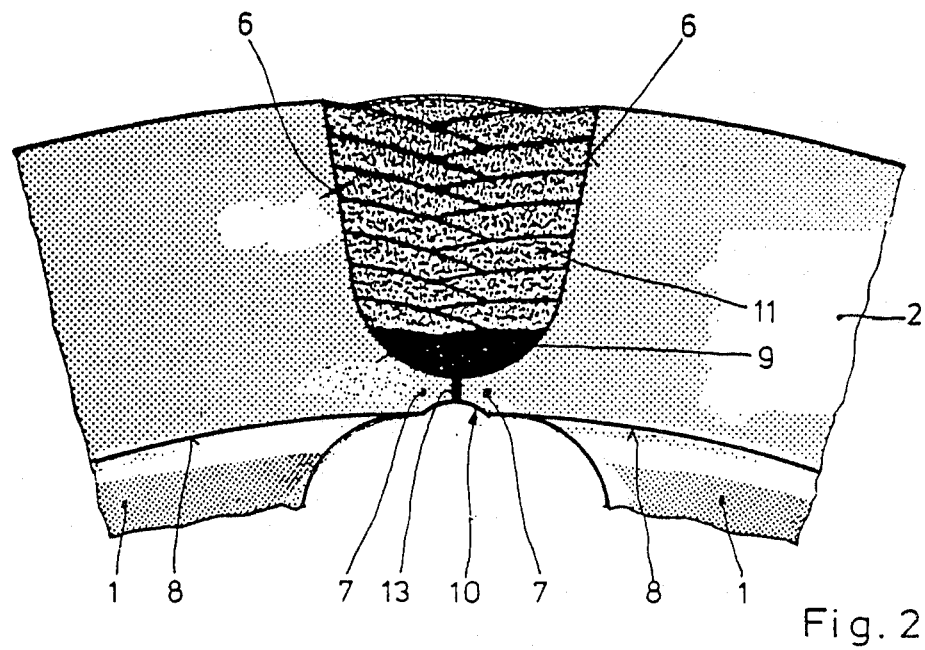
FIG. 2 shows the end view of a first welding embodiment

The seam preparation may be seen in FIG. 2. The flanks 6 of the welding groove 4 are V-shaped. It is, of course, equally possible to use a U-shape or any other suitable flank shape. The flanks 6 each extend to welding lips 7, which come together to form a butt joint 13. The welding lips 7 are located directly on the bottom 8 of the shroud 2 facing towards the blade airfoil 1 or the top 12 of the root platform 2 (FIG. 1).

The foundation seam 9 consists of a weld produced by the tungsten inert gas method (TIG) with additive material. To make the diagram more easily understandable, the lips 7 are shown in their condition before the welding of the foundation seam. During welding, these lips are at least partially melted and solidify to form the seam root. Because each of the welding lips 7 is located at the outermost end of the platforms, the roots formed are accessible for subsequent machining and testing.

The filling seam 11 is produced by hand welding using coated electrodes. Because the weld runs are applied alternately to one and the other flanks 6, the latter are connected together.

Figure 3:
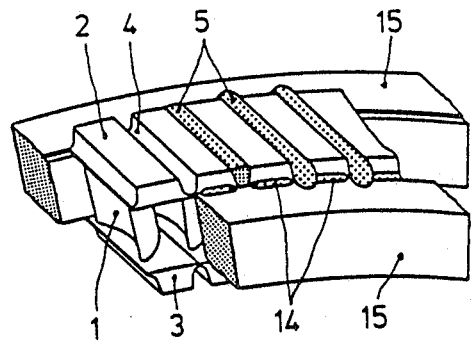
FIG. 3 shows an excerpt from a ring prepared for welding.

The way in which the individual blades are welded together is outlined in FIG. 3. The blades are assembled to form a ring. Foundation seam welding then takes place in a protective gas atmosphere. Using tack welds 14, welding rings 15 are welded gastight to the blades on both sides of the blades.

The foundation seam and full seam welding described with respect to FIG. 2 then follows, each blade being connected to its neighboring blades to form a closed ring both at the shrouds 2 and the root platforms 3. The fully welded control wheel is subsequently subjected to heat treatment.

Immediately after welding, the control wheel is directly heated from the welding temperature to the annealing temperature of about 700° C. Isothermal transformation takes place in the weld material and in the heat-affected zone during this annealing phase. The type of grain structure occurring during this phase is not technically usable. However, there is no danger of cracking during this step in the process because the transformation stresses are low at 700° C., the welding stresses have been reduced and the ductility is better than that of martensite. After the annealing has been completed, the control wheel is cooled in air.

The machining, which includes all of the operations necessary for preparing a control wheel for welding onto a disk 16 of the rotor 17, is the next step undertaken. The welding rings 15 are cut off and the end faces of the wheel are turned to dimension. An operation worth particular mention at this point is the removal of the seam root of the shroud and root platform welds, as indicated by the arrow 10 in FIG. 2. These roots and any residual gaps possibly occurring are, for example, milled out and subsequently polished. They are then accessible for conventional ultrasonic and magnetic powder testing.

After the tests have been carried out, the essential heat treatment step follows. For this purpose, the welding rings 15 are again applied so as to be gastight since, during the heat treatment, scavenging is carried out using a protective gas, for example argon. The heat treatment includes a hardening process, i.e. heating to over 1000° C. with subsequent cooling by means of compressed air or spray mist, and, an annealing procedure at heat treatment temperatures around 700° C. with subsequent furnace cooling to room temperature.

Figure 4:
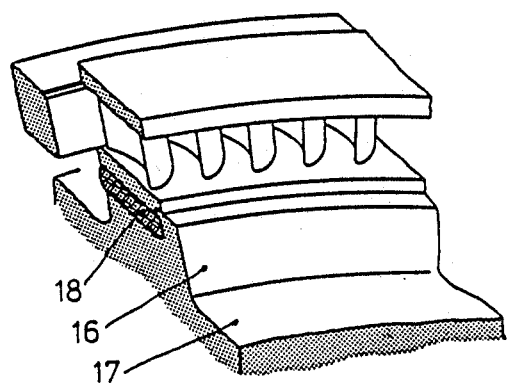
FIG. 4 shows an excerpt of a ring welded onto the rotor.

After the heat treatment has been concluded, the root parts of the control wheel are fully turned for welding onto the disk 16 of the rotor 17. The welding, which is shown diagrammatically in FIG. 4, is carried out by means of a large bell seam 18 using the submerged arc process.

Figure 5:
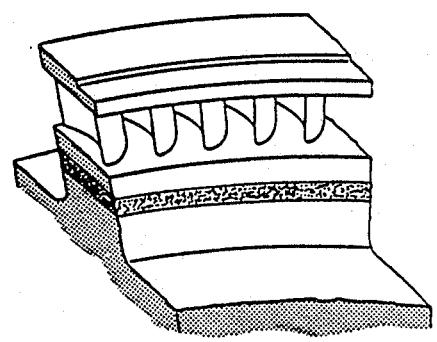
FIG. 5 shows an excerpt of the fully machined rotor wheel.

The fully machined wheel part, in which the transition from the rotor to the blades is turned smooth on both sides, is shown in FIG. 5. It should be noted that the root seam of the bell weld 18, in which the initiation of any cracks would tend to occur, has been turned off. The control wheel and the rotor now form an inseparable unit.

Figure 6:
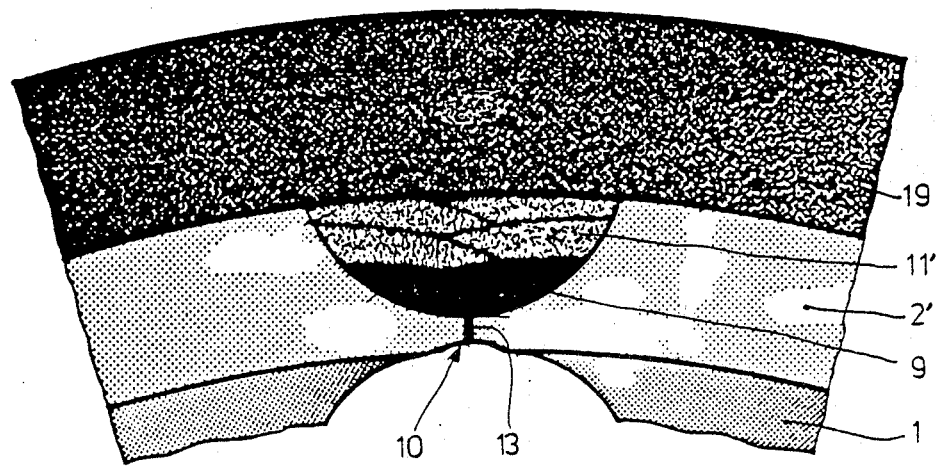
FIG. 6 shows the end view of a second welding embodiment.

The embodiment shown in FIG. 6 has the advantage that the transverse welds connecting the shrouds and root platforms are kept small.

The individual blades machined from a blank have, in this case, relatively thin, for example 4 mm thick, root platforms and shrouds 2', which form a narrow collar after they have been welded together. In the case shown, the transverse seam consists of a foundation seam 9 produced by means of the TIG method and a filling weld 11' applied by hand in several layers. A welding layer 19 is subsequently applied, preferably automatically, over the whole width of the platform in the peripheral direction of the control wheel by means of the submerged arc process. This, therefore, provides a means of arbitrarily increasing the height of the shroud or root platform. Because of the less extensive hand-welding, this solution may permit additional quality.

Under certain circumstances, it may even be possible to do without the layer 11' applied by hand using coated electrodes, i.e. the peripheral layer 19 could be welded directly onto the foundation seam 9 applied by the TIG method.

The invention is not, of course, limited to the solutions shown and described up to this point. Instead of the TIG foundation seam in the arrangements of FIGS. 2 and 6, the shrouds and/or root platforms could be connected together in a first step in the process by means of electron beam, plasma beam or laser beam welding processes. The butt joints to be welded could be formed in a correspondingly different manner in these cases.

Figure 7:
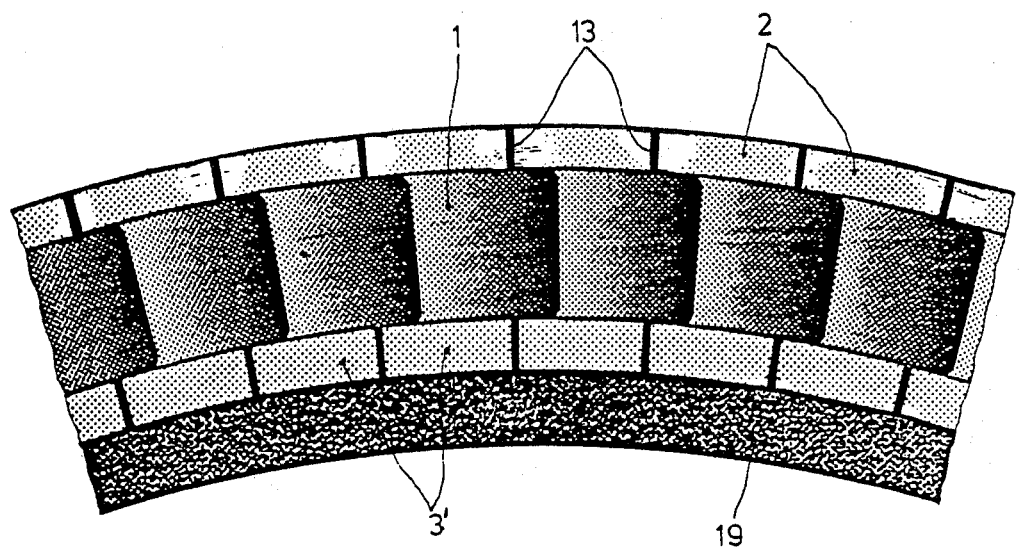
FIG. 7 shows an excerpt of a welded ring after a third welding embodiment.

FIG. 7 shows an embodiment in which the shrouds 2 and the root platforms 3' are connected together by means of electron beam welding over the full radial extent at the butt joints 13. The root platforms 3', which have an extremely large thickness in this case, but which could just as well form a narrow collar like the shrouds 2' in FIG. 6, are provided with a peripheral coating 19 produced by means of the submerged arc process.

What is claimed is:

1. A method of manufacturing a control wheel for a high-pressure rotor in a steam turbine, said control wheel being formed from a rotor disk and a plurality of individual blades, each of said blades including a root platform and a shroud, said method comprising the steps of:

assembling said blades together to form a ring, welding said assembled blades to their neighboring blades at the root platforms and the shrouds so that closed rings are formed by the root platforms and the shrouds, isothermally transforming the weld material and the ring by heating the ring after the welding to an annealing temperature in the absence of cooling, heat-treating the ring subsequent to the welding so that the weld connections have substantially the same properties as the ring, and assembling the ring onto the rotor disk.

2. A method of claim 1, wherein the root platforms and the shrouds are provided with flank sections, further comprising the steps of:

forming butt joints at points of contact between adjoining root platforms, welding said blades at said butt joints by a foundation seam, and forming filling seams at the flanks formed by welding grooves in the blades, by applying welding runs to one of said flanks and, alternately, to an adjoining flank.

3. A method as claimed in claim 2, further comprising the step of increasing the thickness of the shrouds in a radial extent by applying a plurality of layers of weld runs in a peripheral direction of the control wheel.

4. A method as claimed in claim 1, further comprising the step of:

forming butt joints at the points of contact between adjoining root platforms, and welding said blades at said butt joints.

5. A control wheel for use on a high-pressure rotor of a steam turbine of the type including a plurality of blades, each having a shroud and a root platform, said shrouds of said blades comprising grooves extending to first welding lips forming first butt joints, said first welding lips being directly on the sides of said shrouds and having surfaces extending in the direction of said blades, the improvement comprising:

grooves on said root platforms extending to second welding lips forming second butt joints, said second welding lips being on the sides of said root platforms and having surfaces extending in the direction of said blades, each of said blades being welded to neighboring blades at both said shrouds and said root platforms, the plurality of welded shrouds and the plurality of welded root platforms each defining a closed ring assembled therefrom.

6. A control wheel as claimed in claim 5, wherein collars are formed by said shrouds and said root platforms of said ring and a weld layer is applied to at least one of said collars.

* * * * *